United States Patent
Chen et al.

(10) Patent No.: US 9,376,807 B2
(45) Date of Patent: Jun. 28, 2016

(54) PASSIVE STRUCTURES WITH HIGH STIFFNESS AND HIGH DAMPING PROPERTIES

(75) Inventors: Bing-Chung Chen, Newbury Park, CA (US); Kyle D. Gould, Los Angeles, CA (US); Ten-Luen Liao, South Pasadena, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 778 days.

(21) Appl. No.: 13/591,009

(22) Filed: Aug. 21, 2012

(65) Prior Publication Data

US 2013/0047523 A1 Feb. 28, 2013

Related U.S. Application Data

(60) Provisional application No. 61/526,603, filed on Aug. 23, 2011.

(51) Int. Cl.
| | |
|---|---|
| *B25B 1/08* | (2006.01) |
| *E04B 1/98* | (2006.01) |
| *F16F 7/104* | (2006.01) |
| *B64C 1/06* | (2006.01) |
| *E02B 17/00* | (2006.01) |

(52) U.S. Cl.
CPC ............. *E04B 1/985* (2013.01); *F16F 7/104* (2013.01); *B64C 1/062* (2013.01); *E02B 2017/0091* (2013.01)

(58) Field of Classification Search
USPC ........... 267/159–162, 164; 248/618; 188/378; 52/167.1
See application file for complete search history.

(56) References Cited

U.S. PATENT DOCUMENTS

| | | | | |
|---|---|---|---|---|
| 2,368,193 | A | * | 1/1945 | Boynton .................... 267/159 |
| 2,571,170 | A | * | 10/1951 | Stilwell, Jr. ................ 60/529 |
| 2,604,316 | A | * | 7/1952 | O'Brien et al. ............ 267/159 |
| 3,213,240 | A | * | 10/1965 | Kruger et al. ............... 337/91 |
| 3,496,318 | A | * | 2/1970 | Culver .................... 200/83 Y |
| 3,610,606 | A | * | 10/1971 | Andrews .................... 267/74 |
| 3,743,266 | A | * | 7/1973 | Sturman et al. ............ 267/31 |
| 3,817,356 | A |   | 6/1974 | Dahlquist ................. 188/1 B |
| 3,871,193 | A | * | 3/1975 | Young ........................ 464/21 |
| 3,873,078 | A | * | 3/1975 | Wolf ......................... 267/159 |
| 4,434,863 | A | * | 3/1984 | Garrett ...................... 175/321 |
| 4,706,788 | A |   | 11/1987 | Inman et al. ............. 188/378 |
| 4,795,123 | A |   | 1/1989 | Forward et al. ........... 248/550 |

(Continued)

*Primary Examiner* — Christopher Schwartz
(74) *Attorney, Agent, or Firm* — Koppel, Patrick, Heybl & Philpott

(57) ABSTRACT

A passive structural system includes a structural element which may be subjected to energy which gives rise to vibration in the element. At least one bi-stable sub-structure is coupled to the element. Each bi-stable sub-structure has two stable equilibrium states between which the sub-structure can physically transition when subjected to a sufficient amount of energy which gives rise to vibration in the element, with each bi-stable sub-structure arranged to dissipate at least a portion of the energy and thereby damp the vibration in the structural element when it transitions from one equilibrium state to the other. The passive structural system may also be intentionally mistuned such that when subjected to energy which gives rise to vibration, the vibration energy is substantially confined to localized regions within the system. The bi-stable structures are then located in the localized regions and arranged to dissipate the localized vibration energy.

29 Claims, 4 Drawing Sheets

(56) References Cited

U.S. PATENT DOCUMENTS

| | | | |
|---|---|---|---|
| 4,954,375 A | 9/1990 | Sattinger et al. | 428/34.1 |
| 4,968,010 A * | 11/1990 | Odobasic | B60G 11/48 267/140.11 |
| 5,087,491 A | 2/1992 | Barrett | 428/34.5 |
| 5,209,326 A | 5/1993 | Harper | 188/378 |
| 5,269,499 A * | 12/1993 | Schwab | 267/159 |
| 5,310,157 A | 5/1994 | Platus | 248/619 |
| 5,335,463 A | 8/1994 | Reinhall | 52/167 R |
| 5,368,914 A | 11/1994 | Barrett | 428/201 |
| 5,370,352 A | 12/1994 | Platus | 248/619 |
| 5,560,456 A * | 10/1996 | Koch et al. | 188/300 |
| 5,641,248 A * | 6/1997 | Arlt, III | E21B 19/006 166/350 |
| 6,032,552 A * | 3/2000 | Alleai | F16F 7/10 248/562 |
| 6,705,813 B2 * | 3/2004 | Schwab | 411/526 |
| 6,869,375 B2 | 3/2005 | Welsh | 474/153 |
| 7,017,857 B2 | 3/2006 | Hill et al. | 244/17.13 |
| 7,461,728 B2 | 12/2008 | Huston et al. | 188/378 |
| 7,564,163 B2 | 7/2009 | Onoda et al. | 310/316.01 |
| 7,735,812 B2 | 6/2010 | Fitzgerald | 267/293 |
| 8,151,954 B2 | 4/2012 | Hasegawa | 188/380 |
| 8,184,266 B2 * | 5/2012 | Starreveld et al. | G03F 7/70758 355/72 |

* cited by examiner

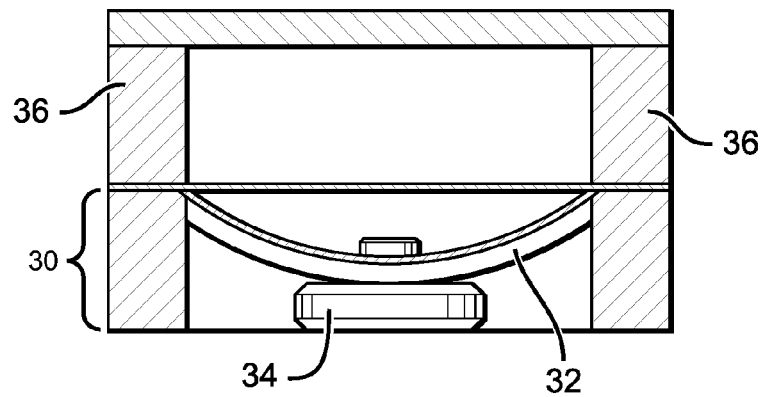
FIG. 3a
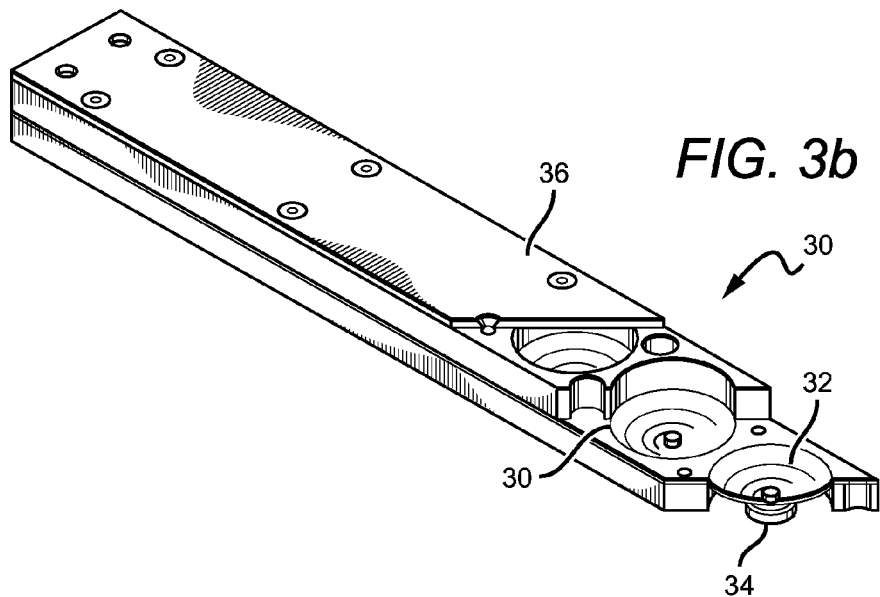
FIG. 3b
FIG. 4a
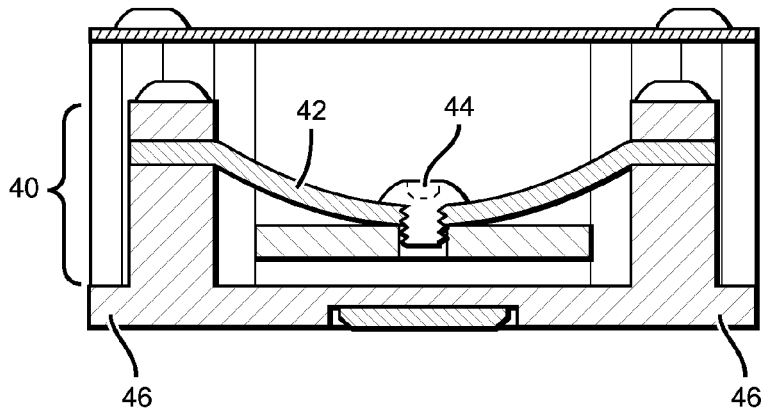

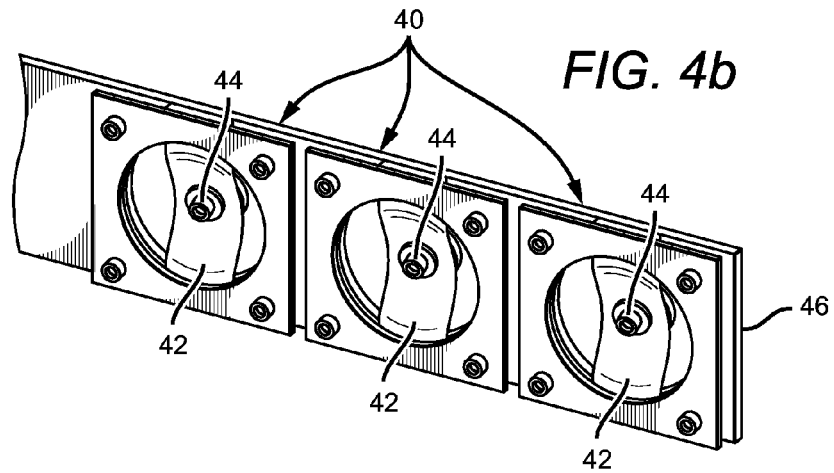
FIG. 4b
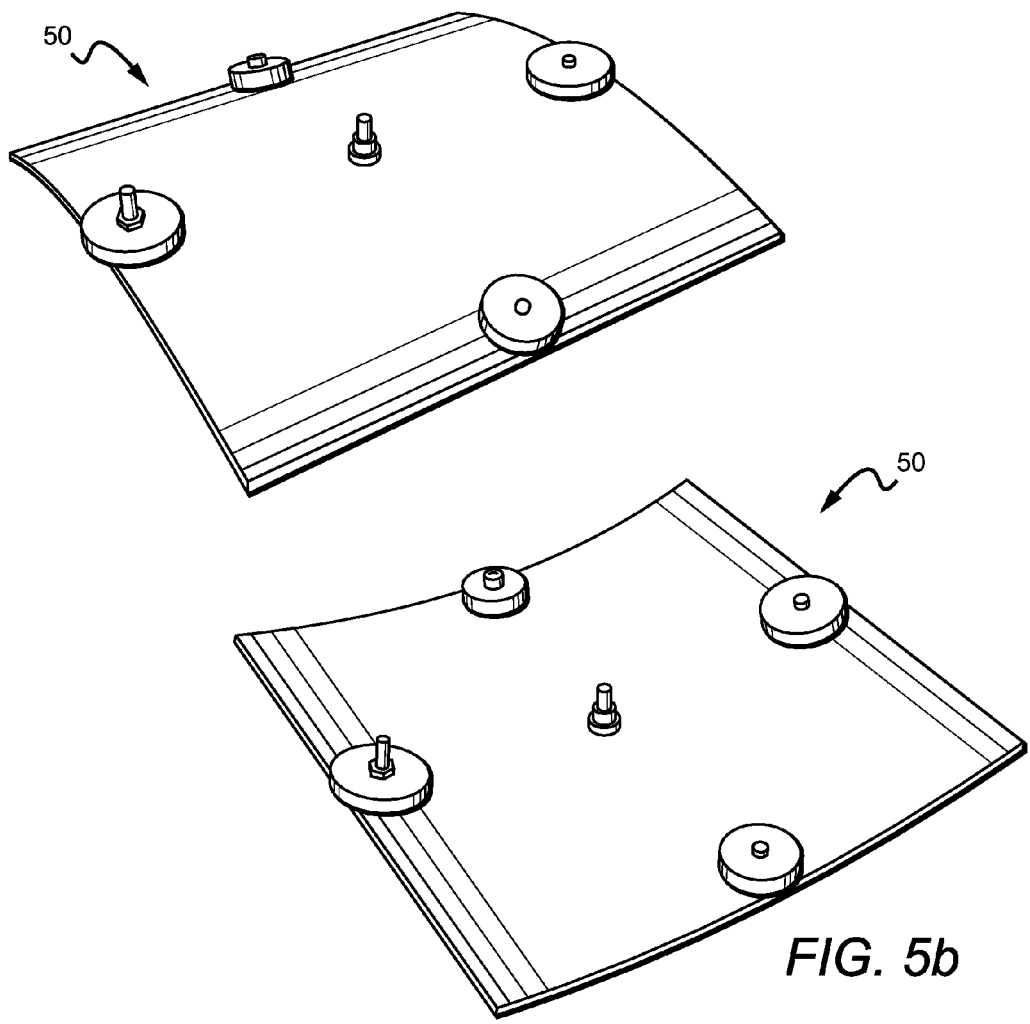
FIG. 5a
FIG. 5b

PASSIVE STRUCTURES WITH HIGH STIFFNESS AND HIGH DAMPING PROPERTIES

RELATED APPLICATIONS

This application claims the benefit of provisional patent application No. 61/526,603 to Bing-Chung Chen et al., filed Aug. 23, 2011.

BACKGROUND OF THE INVENTION

1. Field of the Invention

This invention relates to high stiffness passive structures, and particularly to damping techniques suitable for use with such structures.

2. Description of the Related Art

Structural elements are used for a myriad of purposes. Such elements often need to provide high stiffness; one class of structure system which exhibits extreme stiffness is made from metals such as aluminum or steel. Such structures are often subjected to vibration and shock. However, due to the structure's characteristic stiffness, it may lack sufficient damping capability to mitigate the vibration, which may result in the failure of the structure or any attached equipment.

Another class of structure system employs conventional visco-elastic (damping) materials to mitigate shock and vibration, but this can result in the structure having a stiffness which is inadequate to the needs of a major structural element.

Vibration suppression in many engineering systems is achieved via active control. Common active vibration control methods require the use of sensors and actuators (such as piezoceramic patches) in the system, and need additional input power to operate. However, most active vibration systems have high costs and are technologically complex, and may be impractical for use in difficult environments such as the open ocean.

SUMMARY OF THE INVENTION

A structural system is presented which overcomes the problems noted above, providing high stiffness and high damping with a passive system.

The present system includes a structural element which may be subjected to energy which gives rise to vibration in the element. At least one bi-stable sub-structure is coupled to the element. Each bi-stable sub-structure has two stable equilibrium states between which the sub-structure can physically transition when subjected to a sufficient amount of energy which gives rise to vibration in the element, with each bi-stable sub-structure arranged to dissipate at least a portion of the energy and thereby damp the vibration in the structural element when it transitions from one equilibrium state to the other.

The passive structural system may also be intentionally mistuned such that when subjected to energy which gives rise to vibration, the vibration energy is substantially confined to localized regions within the system. The bi-stable structures are then located in the localized regions and arranged to dissipate the localized vibration energy.

Further features and advantages of the invention will be apparent to those skilled in the art from the following detailed description, taken together with the accompanying drawings.

BRIEF DESCRIPTION OF THE DRAWINGS

FIGS. 3a and 3b are sectional and perspective views, respectively, of one possible embodiment of a bi-stable sub-structure per the present invention.

FIGS. 4a and 4b are sectional and perspective views, respectively, of another possible embodiment of a bi-stable sub-structure per the present invention.

FIGS. 5a and 5b are views of another possible embodiment of a bi-stable sub-structure per the present invention, in each of its stable equilibrium states.

DETAILED DESCRIPTION OF THE INVENTION

Figure 1:
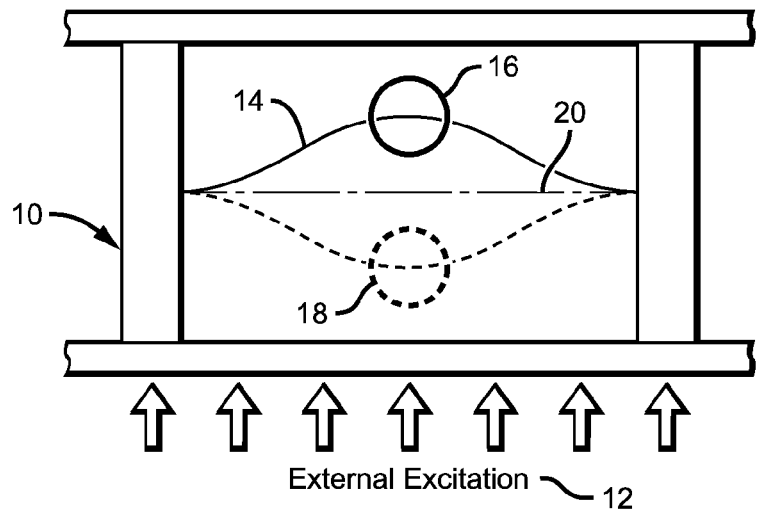
FIG. 1 is a diagram illustrating the principles of a passive structural system per the present invention.

The present passive structural system is capable of attaining high stiffness and high damping simultaneously, by employing bi-stable sub-structures which serve to damp vibration in the system. A diagram illustrating the principles of a passive structural system per the present invention is shown in FIG. 1.

The present passive structural system comprises a structural element 10 which may be subjected to energy 12 ("external excitation") which gives rise to vibration in the structural element. At least one bi-stable sub-structure 14 is coupled to the structural element. Each bi-stable sub-structure has two stable equilibrium states 16, 18 between which the sub-structure can physically transition when subjected to a sufficient amount of energy 12, such that the sub-structure dissipates at least a portion of energy 12 and thereby damps the vibration in structural element 10 when it physically transitions from one equilibrium state to the other.

Figure 2:
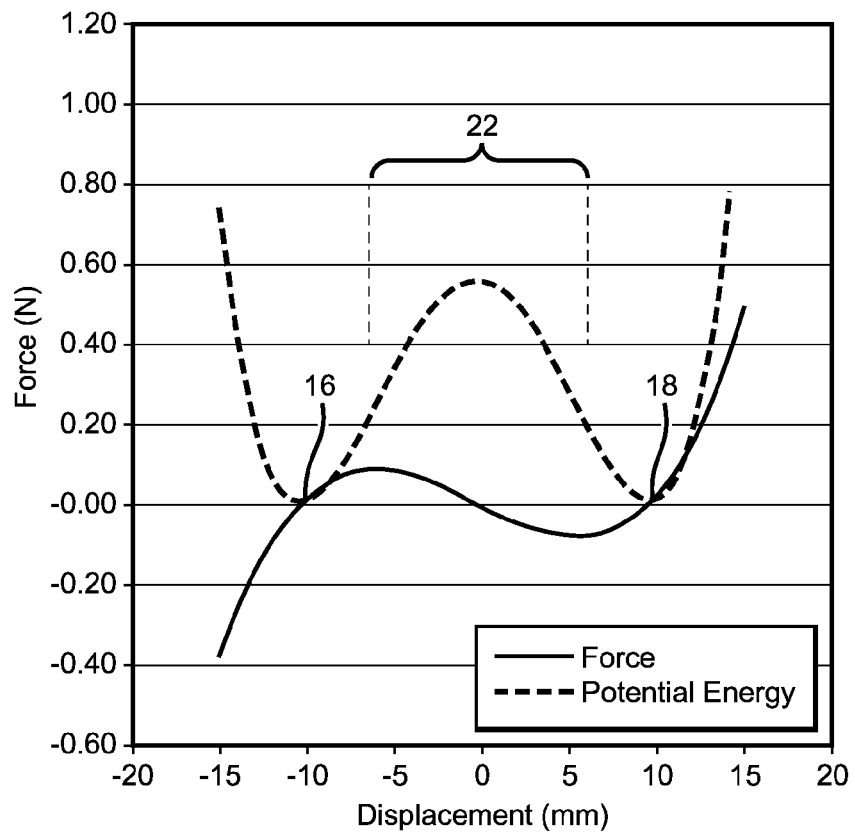
FIG. 2 is a graph depicting a negative stiffness region for a passive structural system per the present invention.

Each of the stable equilibrium states has an associated equilibrium position (16, 18) relative to a nominal center position 20 between the stable equilibrium states. Each bi-stable sub-structure has an associated relationship between reaction force and the displacement between the sub-structure and nominal center position 20, and is arranged such that when the bi-stable sub-structure is acted upon by a force, the reaction force is in the same direction as the action force and the sub-structure enters a negative stiffness region where the slope of the reaction force over displacement is negative. This is illustrated in the graph shown in FIG. 2, which plots reaction force, displacement, and potential energy. As external excitation causes the sub-structure 14 to move from one of its equilibrium positions (e.g., position 16) towards its nominal center position, it enters a 'negative stiffness region' 22 and 'snaps-through' to its other equilibrium position (e.g., position 18). The transient, unstable negative stiffness condition can produce a large loss factor, especially if the mass of the transitioning sub-structure is also large.

Each of the bi-stable sub-structures includes a movable element which may be in either of the two stable equilibrium states or transitioning between the states, and which has an associated mass. The inertia of the mass when subjected to energy which gives rise to vibration in the structural element causes the sub-structure to transition from one of the stable equilibrium states to the other. The bi-stable sub-structures can be arranged such that the associated mass consists solely of the inherent mass of the movable element. Alternatively, one or more additional masses can be coupled to the movable element, such that the bi-stable sub-structure's associated mass consists of the inherent mass of the movable element plus the mass of the additional masses. At least one of the additional masses is preferably coupled to the point of the movable element which exhibits the greatest amount of displacement when the bi-stable sub-structure transitions from one of its equilibrium states to the other, as this provides the greatest amount of damping.

The bi-stable sub-structures can take any of a number of forms. One possible embodiment is depicted in the sectional and perspective views shown in FIGS. 3a and 3b, respectively. Here, the bi-stable sub-structure 30 consists of a moveable element 32 which is dome-shaped. The first of the sub-structure's two equilibrium states is as shown in FIG. 3a, with the peak of the dome facing downward; the second equilibrium state would be the mirror image of FIG. 3a, with the peak of the dome facing upward. An additional mass 34 is preferably coupled to the peak of the dome, which is the point of greatest displacement when movable element 32 transitions between equilibrium states. One or more of bi-stable sub-structures 30 are coupled to a structural element 36 and serve to dampen the vibration that arises in element 36 due to external excitation energy.

Another possible embodiment is depicted in the sectional and perspective views shown in FIGS. 4a and 4b, respectively. Here, the bi-stable sub-structure 40 consists of a moveable element 42 which is arch-shaped. The first of the sub-structure's two equilibrium states is as shown in FIG. 4a, with the peak of the arch facing downward; the second equilibrium state would be the mirror image of FIG. 4a, with the peak of the arch facing upward. An additional mass 44 is preferably coupled to the peak of the arch, which is the point of greatest displacement when movable element 42 transitions between equilibrium states. One or more of bi-stable sub-structures 40 are coupled to a structural element 46 and serve to dampen the vibration that arises in element 46 due to external excitation energy.

Another possible embodiment is shown in FIGS. 5a and 5b, which show the bi-stable sub-structure 50 in each of its two equilibrium states. Here, the moveable element comprises a bi-stable composite laminate plate. When the plate 'snaps-through' as it transitions from one equilibrium state to the other in response to vibration energy, a substantial damping force is realized.

The moveable element needs to be made from a material which is stiff enough so that some force is required to make it transition between equilibrium states, yet flexible enough to allow the transition. Suitable materials include silicone rubber, composite laminates, and flexible metal.

Each bi-stable sub-structure has associated characteristics which govern the conditions under which it transitions from one of its equilibrium states to the other. These characteristics may be tailored to provide a desired amount of damping for a given structural element.

The bi-stable sub-structures may be coupled to any portion of the structural element to provide damping. For example, as shown in FIGS. 2a, 2b, 3a and 3b, the sub-structures can be located at one end of the structural element. Another possibility is to couple the bi-stable sub-structures to the structural element periodically (as shown in FIG. 6, discussed below).

Figure 6:
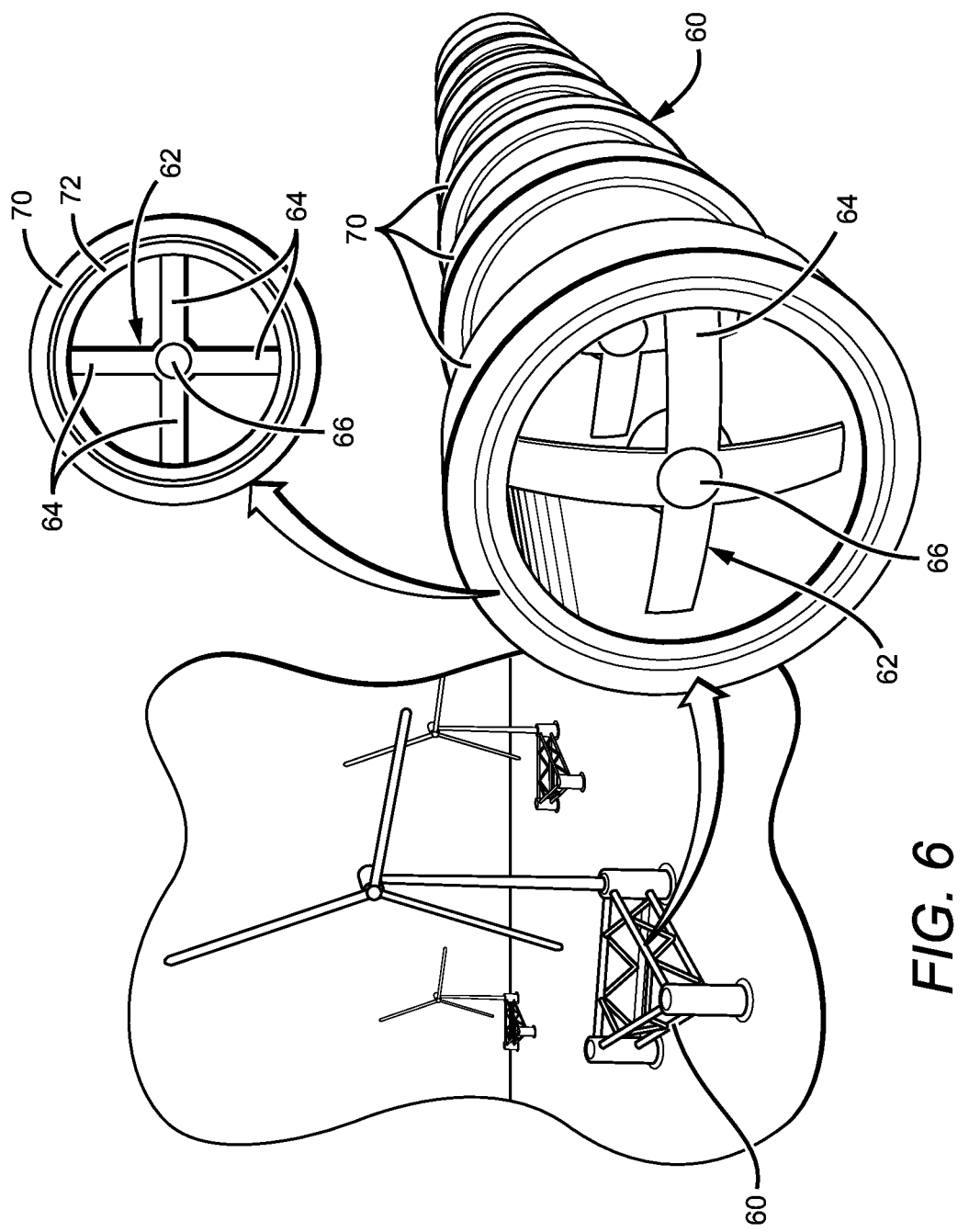
FIG. 6 provides several views of one possible embodiment of a passive structural system per the present invention.

A typical application for a passive structural system as described herein is shown in FIG. 6, in which three structural elements 60 are coupled together to form an off-shore platform for a wind turbine that is located in the ocean. These platforms call for high stiffness and high damping. The present passive structural system, without active control elements, can be easily incorporated into existing structures of this sort and provide the benefits of reliability, simple construction, and low cost.

A perspective view of one of the structural elements is shown in detail, along with an end view of the element. The structural element can be, for example, a rod, bar, beam, or plate; in this example, the structural element is a hollow tube-shaped beam. In this example, each of the bi-stable sub-structures 62 comprise a buckled column 64 which spans the hollow interior of structural element 60, and is oriented perpendicular to the tube's longitudinal axis. Pairs of buckled columns which intersect to form an X-shaped pattern (as shown in FIG. 6) are preferred. Buckled columns 64 are preferably "constrained buckled" columns; i.e., they are in a "ready-to-snap-through" configuration. Here, the columns have two equilibrium states: in the presence of a sufficient amount of vibration energy, the buckled column will switch or "snap-through" between one of its equilibrium states and the other. The triggering of snap-through preferably occurs over a broad band of excitation frequencies. A structure can dissipate a significant amount of energy during this snap-through motion.

Each of the bi-stable sub-structures may further comprise a concentrated mass 66 at the intersection of the buckled columns 64. The motion of buckled columns 64 during transitions between their equilibrium states dissipates at least a portion of the vibration energy; when the concentrated masses snap-through, they experience a large velocity, resulting in additional energy dissipation.

The present passive structural system may be intentionally 'mistuned', such that when the system is subjected to energy that gives rise to vibration, the vibration energy is substantially confined to localized regions within the structural system. When the structure is mistuned in this way, a tailored localization mode can be created which exhibits large amplitude magnification in comparison with a periodic, non-mistuned counterpart; a specifically designed mistuned profile can be tailored to enable structural systems to adapt to varying loads. Bi-stable sub-structures 62 may then be located in those localized regions and arranged to dissipate the localized vibration energy. When so arranged, the underlying load-bearing structural element provides high stiffness, and the bi-stable sub-structures placed in localized regions provide high damping.

One possible way to mistune a passive structural system and thereby localize its vibration energy is shown in FIG. 6. Periodic appendage sub-structures 70 may be coupled to the structural element. In this example, the structural element is tube-shaped, and the appendage sub-structures are rings which are coupled to and encircle the tube at regular intervals; these external encircling rings are arranged to move along the tube's longitudinal axis when subjected to vibration and thereby dissipate at least a portion of the vibration energy. When so arranged, the localized region to which vibration is confined would typically be a specific ring (or several rings) which oscillate at a much larger amplitude than the other rings, and would include the whole cross section of the ring. As a result of vibration in a particular localized region, the snap-through sub-structures in that region vibrate significantly.

To mistune the structure, discrepancies can be introduced between these periodic appendage sub-structures with variations in their geometric parameters or material properties. These discrepancies can give rise to a drastically different dynamic response than that of a perfect periodic structure, leading to the confinement of vibration to small geometric regions—i.e., localization. Vibration localization in a periodic structure is generally undesirable, as it can cause components in the localized areas to vibrate with a large amplitude and possibly fail from high-cycle fatigue. Here, however, this vibration localization is capitalized upon: bi-stable sub-structures are located in the localized regions and arranged to dissipate the localized vibration energy. In this way, a high stiffness, high damping structure can be provided without active control elements.

A layer may be imposed between each encircling ring 70 and structural element 60, to couple the ring to the structural element and to serve as an additional damping element. For example, in the embodiment shown in FIG. 6, there is a coupling elastic and damping material layer 72 between each ring and the surface of structural element 60. Layers 72 have respective material properties; one way in which mistuning can be accomplished is to ensure that one or more material properties of layers 72 vary from layer to layer. For example, the stiffness and/or damping coefficient of layers 72 can be made to vary from layer to layer.

Encircling rings 70 have respective parameters. Another way in which mistuning can be effected is by having one or more ring parameter vary from ring to ring. For example, encircling ring diameter and/or encircling ring weight (e.g., rings having respective diameters of 0.5, 0.5, 0.52, 0.51, 0.5 cm, etc. and or rings with slightly different densities) could be made to vary from ring to ring.

Another possible technique to mistune the structural element is to arrange encircling rings 70 so that they are distributed at unequal intervals along the axial length of structural element 60; the unequal intervals result in the element being mistuned.

The damping mechanisms—here, coupling elastic and damping material layer 72 and snap-through sub-structures 64—become the most effective when they are applied to designated areas where the vibration energy is confined. This confinement technique can suppress vibration much more effectively than many traditional methods.

A passive structural system as described herein may also include a structural link (not shown) which couples the periodic appendage sub-structures together. For example, a structural link could be used to couple encircling rings 70 to each other, which serves to disperse the vibration energy over a larger area. A structural link might also be used to couple together periodic bi-stable sub-structures 64.

The methodology described herein to construct a high stiffness, high damping structural element can be further extended to more generic structural elements such as torsional bars, bending beams, compression or bending plates, etc., that form the basis for various 2-D and 3-D structural systems. The methodology can be readily utilized to develop a whole library of mistuned periodic structural elements exhibiting high stiffness and high damping over a wide spectrum of loading range for different applicable environments. It should also be noted that bi-stable sub-structures as described herein can be arranged such that they can be retrofitted into existing structural frame elements.

In addition to using conventional visco-elastic materials (such as silicone rubber) to dissipate vibration energy, other novel units can also be installed to dissipate energy more effectively. Snap-through or constrained buckled columns are just a few examples to be incorporated into this structural logic system.

Passive structural elements as described herein have many possible applications. In addition to the off-shore platform application discussed above, such structures might find use, for example, within aerospace engines and components, to improve engine reliability and reduce noise by reducing vibration. Another possible application would be within high sensitivity electronic systems and instrumentation which calls for low vibration control. In general, the present passive structural system may be used with any structure for which vibration is to be damped.

While particular embodiments of the invention have been shown and described, numerous variations and alternate embodiments will occur to those skilled in the art. Accordingly, it is intended that the invention be limited only in terms of the appended claims.

We claim:
1. A passive structural system, comprising:
a structural element which may be subjected to energy which gives rise to vibration in said structural element;
at least one bi-stable sub-structure coupled to said structural element, each of said bi-stable sub-structures having two stable equilibrium states between which said sub-structure can physically transition when subjected to a sufficient amount of said energy which gives rise to vibration in said structural element, each of said bi-stable sub-structures arranged to dissipate at least a portion of said energy and thereby damp the vibration in said structural element when it physically transitions from one of said equilibrium states to the other,
wherein each of said bi-stable sub-structures comprises a movable element which has an associated mass and may be in either of said two stable equilibrium states or transitioning between said states, the inertia of said mass when subjected to said energy which gives rise to vibration in said structural element causing said bi-stable sub-structure to transition from one of said stable equilibrium states to the other,
wherein each of said stable equilibrium states has an associated equilibrium position relative to a nominal center position between said equilibrium positions, each of said bi-stable sub-structures having an associated relationship between reaction force and the displacement between said bi-stable sub-structure and said nominal center position and arranged such that when said bi-stable sub-structure is acted upon by a force, said reaction force is in the same direction as the action force and the sub-structure enters a negative stiffness region where the slope of the reaction force over displacement is negative.

2. The system of claim 1, further comprising one or more additional masses coupled to said movable element, said bi-stable sub-structure arranged such that said associated mass consists of the inherent mass of said movable element plus the one or more additional masses coupled to said movable element.

3. The system of claim 2, wherein one of said additional masses is coupled to the point of said movable element which exhibits the greatest amount of displacement when said bi-stable sub-structure transitions from one of said equilibrium states to the other.

4. The system of claim 1, wherein said structural element is a hollow structure having an associated longitudinal axis, each of said bi-stable sub-structures comprising an buckled column which spans the hollow interior of said structural element and is oriented perpendicular to said tube's longitudinal axis.

5. The system of claim 4, wherein each of said buckled columns is a constrained, buckled column.

6. The system of claim 1, said bi-stable sub-structure arranged such that said associated mass consists solely of the inherent mass of said movable element.

7. The system of claim 1, wherein each of said movable elements is dome-shaped or arch-shaped.

8. The system of claim 1, wherein said movable elements comprise silicone rubber, composite laminates, or flexible metal.

9. The system of claim 1, wherein each of said bi-stable sub-structures comprises a movable element comprising a bi-stable composite laminate plate.

10. The system of claim 1, wherein a plurality of said bi-stable sub-structures are coupled to said structural element periodically.

11. The system of claim 1, wherein each of said bi-stable sub-structures has associated characteristics which govern the conditions under which said bi-stable sub-structure transitions from one of said equilibrium states to the other, said characteristics tailored to provide a desired amount of damping for said structural element.

12. The system of claim 1, wherein said passive structural system is intentionally mistuned such that when said passive structural system is subjected to energy that gives rise to vibration in said structural system, said vibration energy is substantially confined to localized regions within said structural system, said bi-stable structures located in said localized regions and arranged to dissipate said localized vibration energy.

13. A passive structural system, comprising:
a structural element;
periodic appendage sub-structures attached to said structural element and mistuned such that when said structural system is subjected to energy that gives rise to vibration in said structural system, said vibration energy is substantially confined to localized regions within said structural system; and
damping elements in said localized regions arranged to dissipate said localized vibration energy,
wherein said structural element is a hollow tube-shaped structure, said damping elements comprising bi-stable sub-structures located within and along the axial length of said tube at respective ones of said localized regions, said bi-stable sub-structures having two equilibrium states and arranged to transition from one equilibrium state to the other when subjected to said vibration energy and thereby dissipate at least a portion of said vibration energy,
wherein each of said bi-stable sub-structures comprises a movable element which has an associated mass and may be in either of said two stable equilibrium states or transitioning between said states, the inertia of said mass when subjected to said energy which gives rise to vibration in said structural system causing said bi-stable sub-structure to transition from one of said stable equilibrium states to the other.

14. The system of claim 13, wherein said periodic appendage sub-structures are rings that are coupled to and encircle said structural element.

15. The system of claim 14, wherein one of said damping elements comprises a layer between each of said encircling rings and said structural element, each of said layers comprising a coupling elastic and damping material and arranged to couple a respective encircling ring to said structural element.

16. The system of claim 15 wherein said layers have respective material properties, at least one of which varies from layer to layer, said variance resulting in at least a portion of said mistuning.

17. The system of claim 16, wherein said material property which varies from layer to layer comprises stiffness and/or damping coefficient.

18. The system of claim 15, wherein said encircling rings are distributed along the axial length of said tube, said encircling rings arranged to move along said tube's longitudinal axis when subjected to vibration and thereby dissipate at least a portion of said vibration energy.

19. The system of claim 14, wherein said encircling rings have respective parameters, at least one of which varies from ring to ring, said variance resulting in at least a portion of said mistuning.

20. The system of claim 19, wherein said parameters comprise encircling ring diameter and/or encircling ring weight.

21. The system of claim 14, wherein said encircling rings are distributed at equal intervals along the axial length of said tube.

22. The system of claim 14, wherein said encircling rings are distributed at unequal intervals along the axial length of said tube, said unequal intervals resulting in at least a portion of said mistuning.

23. The system of claim 13, wherein each of said bi-stable sub-structures comprises an buckled column which spans the hollow interior of said tube and is oriented perpendicular to said tube's longitudinal axis.

24. The system of claim 23, wherein each of said buckled columns is a constrained, buckled column.

25. The system of claim 13, wherein each of said bi-stable sub-structures comprises a pair of buckled columns which intersect to form an X-shaped pattern, each of said buckled columns arranged to span the hollow interior of said tube and oriented perpendicular to said tube's longitudinal axis.

26. The system of claim 25, wherein each of said associated masses comprises a concentrated mass at a respective one of the intersections of said buckled columns, the motion of said buckled columns and said concentrated masses during said transitions between said equilibrium states dissipating at least a portion of said vibration energy.

27. The system of claim 13, further comprising a structural link which couples said periodic appendage sub-structures together.

28. The system of claim 27, wherein said periodic appendage sub-structures are rings that are coupled to and encircle said structural element, said structural link coupling said encircling rings together.

29. The system of claim 27, said at least one of said damping elements comprising bi-stable sub-structures located along the axial length of said tube at respective localized regions within said tube, said structural link coupling said encircling bi-stable sub-structures together.

* * * * *